March 26, 1946.  J. B. TINDALL  2,397,384
PRODUCTION OF 1,1-DICHLORO-1-NITROALKANES
Filed June 2, 1944
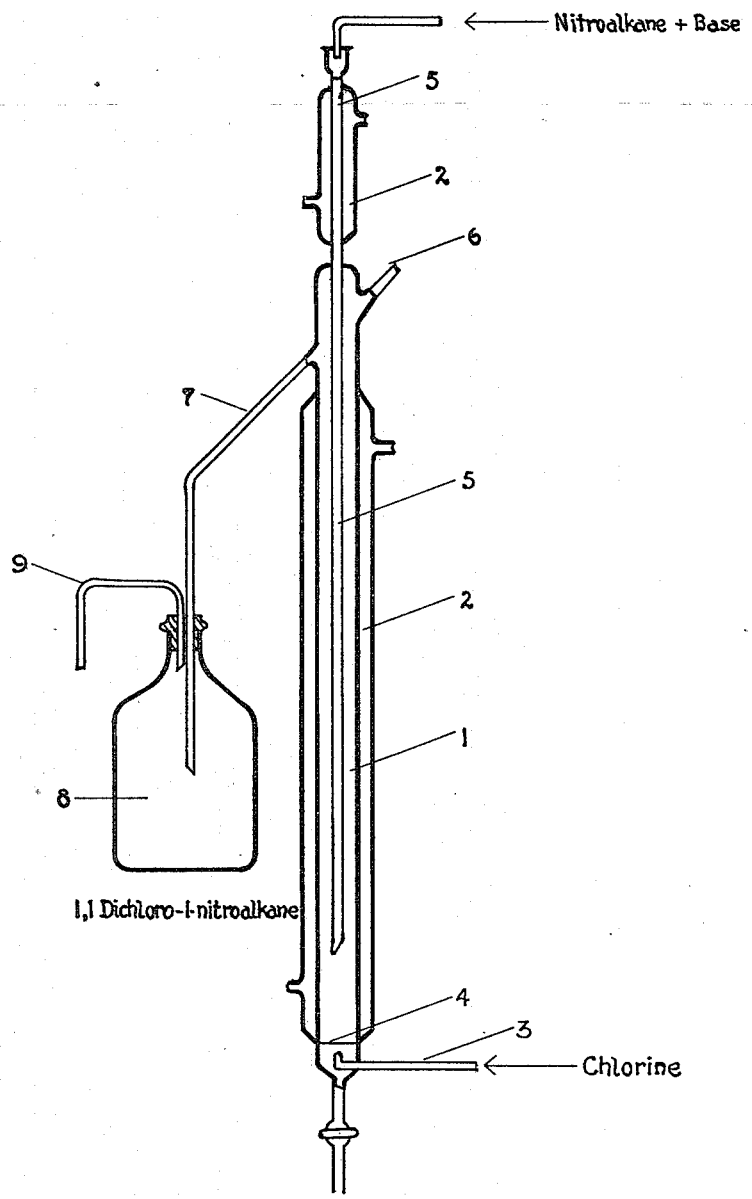
Inventor
John B. Tindall
By Francis M. Crawford
Attorney Patented Mar. 26, 1946

2,397,384

UNITED STATES PATENT OFFICE 2,397,384

PRODUCTION OF 1,1-DICHLORO-1-NITROALKANES

John B. Tindall, Terre Haute, Ind., assignor to Commercial Solvents Corporation, Terre Haute, Ind., a corporation of Maryland Application June 2, 1944, Serial No. 538,527

10 Claims. (Cl. 260—644)

This invention relates to a process for preparing 1,1-dichloro-1-nitroalkanes containing more than one carbon atom.

An object of the invention is to provide a process for obtaining 1,1-dichloro-1-nitroalkanes containing more than one carbon atom in high yields.

Another object is to provide a continuous process for preparing 1,1-dichloro-1-nitroalkanes of the class described.

A still further object is to prepare 1,1-dichloro-1-nitroalkanes having more than one carbon atom, from primary nitroalkanes without the necessity for first preparing the monochlorinated compound.

Other objects will appear hereinafter.

These and other objects are accomplished by my invention in which a solution of a salt of an aci nitroalkane containing more than one carbon atom, plus an excess of a base is chlorinated in a medium in which an excess of chlorine over that required to neutralize all the basic material introduced, is always present.

It has been common practice in the past to chlorinate nitromethane either partially to obtain the mono- or di-chloronitromethane, or completely to produce the tri-chloronitromethane or so-called chloropicrin. Nitromethane, as is well known, is an anomalous member of the nitroalkane series in many respects, for example, it cannot be used or reacted in alkaline solutions as it goes immediately to the salt of methazonic acid in the presence of alkali as is well known.

More recently a method has been developed for preparing completely chlorinated nitroalkanes having more than one carbon atom, but this method has involved the initial preparation and isolation of the monochloro compound and its subsequent further chlorination resulting in a low yield of completely chlorinated compound and a relatively uneconomic series of preparative steps.

In the drawing, the figure represents schematically a convenient arrangement for carrying out my process in which 1 is the reaction column, equipped with a cooling jacket 2, a chlorine inlet 3, over which is disposed a fritted plate 4. Concentric with column 1 is a nitroalkane salt inlet pipe 5. A vent 6 permits escape of excess chlorine, and an overflow outlet 7 permits withdrawal of the reaction product into separator 8, equipped with vent pipe 9. The apparatus shown is merely for purposes of illustration and should not be considered limiting as my process can be carried out in other suitable types of apparatus adapted to its several steps.

In practicing my invention, I first prepare the aci salt of the nitroalkane to be chlorinated by dissolving an excess of a base, for example, flaked caustic soda in water. The solution is then preferably cooled to room temperature, and the nitroalkane is added slowly thereto with vigorous agitation preferably while maintaining the temperature in the neighborhood of 25 to 30° C.

The amount of base used is somewhat in excess of 2 moles of base per mole of nitroalkane. One mole of base theoretically converts the nitroalkane to its aci salt, but if such a solution is subsequently chlorinated, without additional base only the monochloro compound results. The mechanism of the chlorination reaction as carried out according to my invention to produce the dichlorinated product is not understood, but whatever it may be, I have found that for high yields of dichlorinated product a quantity of base in excess of two molecular equivalents are required with respect to the nitroalkane. The extent of the excess used, does not appear to be critical, and large excesses appear to do no harm, but are undesirable as they require greater amounts of chlorine, since, as described hereinafter, the chlorine employed is used in excess of that required to neutralize all the base used. Accordingly, I prefer to use an excess of base in a quantity up to about one mole, that is, I use a total quantity of base equivalent to between two and three moles of base per mole of nitroalkane.

After preparation of the nitroalkane salt as described above, the reaction column 1 is partly filled with water, and chlorine is introduced through inlet 3 at the bottom of the column, until the water is saturated and an excess of free chlorine is indicated by the escape of chlorine through vent 6. The introduction of chlorine is continued and the nitroalkane salt plus excess base as described, are then fed into the reaction chamber through inlet pipe 5 where the mixture comes into reacting contact with the chlorine emerging through the fritted glass disc 4. The flow of chlorine and nitroalkane salt plus base are regulated relatively to each other in such a manner that free chlorine is always in excess of that required to convert the excess base into hypochlorite. This excess is easily regulated by insuring the escape of a slight excess of chlorine through the vent 6, which is observable by the rise of chlorine bubbles through the column.

As the chlorine and nitroalkane, etc., react, the chlorinated nitroalkane product, mixed with water, is carried up through the column and overflows into a suitable separator container 8 in which the oily chloronitroalkane separates to the bottom and the water rises to the top. The oily layer containing most of the chloronitroalkane product may be recovered as such by separating the layers, and the water layer is either discarded or distilled to recover dissolved and entrained chloronitroalkane. If desired, the entire overflow material may be distilled to recover the pure product.

Since the chlorination reaction is of an exothermic character, it is desirable to cool the reaction mixture during the reaction, and this can be done conveniently by means of cooling water circulating through jacket 2, around the reaction chamber, and by regulating the rate of addition of reactants so that the temperature rise is not excessive. In general, the temperature should not be permitted greatly to exceed about 50° C. as yields of chlorinated product tend to be lower above this temperature. The temperature, therefore, should preferably be kept somewhat lower than this, for example, in the neighborhood of between 20 and 30° C.

The procedure described makes continuous operation of my process possible for as long a period as desired simply by the continuous addition of reactants as described and their continuous recovery by simple overflow or other means.

The sequence of operative procedures to be observed in carrying out my process is important, and to obtain the high yields described, the nitroalkane salt, etc., must be added to the chlorinating medium rather than the reverse of adding chlorinating medium to the nitroalkane, etc., solution. The latter procedure results not only in lower yields, but in the production of an impure product.

The basic compounds that may be employed in my process may be any of the alkali metal hydroxides, such as, for example, sodium and potassium hydroxides and the like.

Examples of products which can be prepared according to my process are: 1,1-dichloro-1-nitroethane; 1,1-dichloro-1-nitropropane; 1,1-dichloro-1-nitrobutane; 1,1-dichloro-1-nitropentane; 1,1-dichloro-1-nitrohexane; 1,1-dichloro-1-nitro-2-methyl propane; 1,1-dichloro-1-nitro-2-methylbutane, and the like.

The following specific examples will serve to further illustrate my invention.

Example I

A solution containing 200 parts (5 moles) of sodium hydroxide and 1500 parts of water was prepared and cooled to a temperature of 25° C., after which 150 parts (2 moles) of nitroethane was added thereto with agitation while maintaining the temperature at about 30° C. by cooling.

The reaction chamber was partially filled with water, and chlorine was introduced thereinto until the water was saturated, and an excess of chlorine was indicated by the escape of chlorine bubbles through the vent. Chlorine continued to be introduced in the manner indicated to provide an excess, and the aci nitroalkane salt and excess base as described above, was fed into the reaction chamber. The flow rates of nitroalkane, etc., solution and of chlorine respectively, were regulated so that an excess of chlorine was observed continuously escaping from the vent. The reaction chamber was cooled with water circulating through the cooling jacket so that the temperature did not rise substantially above 30° C. As the reaction proceeded, the liquid level rose in the column and the 1,1-dichloro-1-nitroethane produced was removed by overflow into a suitable container. After all of the sodium aci nitroethane solution had been added, the introduction of chlorine was discontinued and the liquid in the chlorinator was combined with the product collected in the overflow container, and the mixture was steam distilled until no more droplets of oil were observed to come over into the distillate. The oil layer of the distillate was then separated, dried over calcium chloride and redistilled at 120–121° C. (756 mm.). The 1,1-dichloro-1-nitroethane, obtained in this manner amounted to 249.2 parts corresponding to a 90% yield. Upon analysis, the following physical constants were determined:

Specific gravity $\frac{20°}{20°}$ ---------------------- 1.4260
Refractive index, $n_D^{20°}$ ------------------- 1.4451
Chlorine percent by weight
  (theory, 49.29), found --------------- 48.76

If desired, the chlorination need not be discontinued as indicated above, but fresh quantities of the solution of nitroethane aci salt plus base can be prepared and continuously introduced as described while continuously introducing chlorine in the indicated manner. Likewise, the overflowed product may be continuously recovered, and the whole process carried out uninterruptedly for as long a period as is convenient.

Example II

An alkaline solution of the sodium salt of 1-aci-nitrobutane was prepared by dissolving 200 parts (5 moles) of sodium hydroxide in 2500 parts of water, and adding thereto, with agitation 206 parts (2 moles) of 1-nitrobutane. The resulting alkaline salt solution was then subjected to chlorination in accordance with the procedure described in Example I. The quantity of 1,1-dichloro-1-nitrobutane thus produced after purification amounted to 311.3 parts, corresponding to a yield of 90.5 per cent. On analysis the following physical properties were determined:

Specific gravity at 25° C ----------------- 1.3750
Refractive index, $n_D^{25°}$ ------------------- 1.4483
Boiling point, °C. (758 mm.) ------------ 168.0

While the above describes the preferred embodiments of my invention, it will be understood that departures may be made therefrom within the scope of the specification and claims.

This case is a continuation-in-part of my copending application, Serial No. 431,713, filed February 20, 1942.

What is claimed is:

1. A continuous process for preparing 1,1-dichloro-1-nitrolkanes containing more than one carbon atom which comprises continuously introducing into a solution containing an excess of free chlorine, a solution containing a primary nitroalkane containing more than one carbon atom, and an alkali metal hydroxide in excess of twice the amount necessary to form the corresponding aci nitroalkane salt, concomitantly continuously introducing additional chlorine into said solution at such a rate as compared to the rate of introduction of the nitroalkane-base solution, that the chlorine present in said solution is always in excess of the amount required to convert said basic substance into hypochlorite.

2. A continous process for preparing 1,1-dichloro-1-nitroalkanes containing more than one carbon atom which comprises continuously introducing into a solution containing an excess of free chlorine, a solution containing a primary nitroalkane containing more than one carbon atom, and an alkali metal hydroxide in excess of twice the amount necessary to form the corresponding aci nitroalkane salt, concomitantly continuously introducing additional chlorine into said solution at such a rate as compared to the rate of introduction of the nitroalkane-base solution, that the chlorine present in said solution is always in excess of the amount required to convert said basic substance into hypochlorite, and continuously withdrawing and recovering the 1,1-dichloro-1-nitroalkane.

3. A continuous process for preparing 1,1-dichloro-1-nitroalkanes having more than one carbon atom which comprises continuously introducing into a saturated water solution of chlorine containing an excess of free chlorine, a solution containing an alkali metal salt of a primary aci-nitroalkane having more than one carbon atom, and from one to approximately two moles of an alkali metal hydroxide, concomitantly continuously introducing additional chlorine into said solution at such a rate as compared to the rate of introduction of the nitroalkane-base solution, that the chlorine present in said solution is always in excess over the amount required to convert said basic substance to hypochlorite.

4. A continuous process for preparing 1,1-dichloro-1-nitroalkanes having more than one carbon atom which comprises continuously introducing at a temperature of between 20 and 50° C. into a saturated water solution of chlorine containing an excess of free chlorine, a solution containing an alkali metal salt of a primary aci-nitroalkane having more than one carbon atom, and from one to approximately two moles of a base, concomitantly continuously introducing additional chlorine into said solution at such a rate as compared to the rate of introduction of the nitroalkane solution, that the chlorine present in said solution is always in excess over the amount required to convert said basic substance to hypochlorite.

5. A process for preparing 1,1-dichloro-1-nitro-alkanes having more than one carbon atom which comprises introducing at temperatures between 25 and 35° C. into a saturated water solution of chlorine containing an excess of free chlorine, a solution containing an alkali metal salt of a primary aci-nitroalkane having more than one carbon atom, and from one to approximately two moles of a base, concomitantly continuously introducing additional chlorine into said solution at such a rate as compared to the rate of introduction of the nitroalkane solution, that the chlorine present in said solution is always in excess over the amount required to convert said basic substance to hypochlorite as indicated by the escape of chlorine bubbles from the vented reaction chamber.

6. A continuous process for preparing 1,1-dichloro-1-nitroethane which comprises introducing into a saturated water solution of chlorine containing an excess of free chlorine, a solution containing an alkali metal salt of aci-nitroethane, and from one to approximately two moles of an alkali metal hydroxide, concomitantly introducing additional chlorine into said solution at such a rate as compared to the rate of introduction of the nitroethane solution, that the chlorine present in said solution is always in excess over the amount required to convert said basic substance to hypochlorite.

7. A continuous process for preparing 1,1-dichloro-1-nitrobutane which comprises introducing into a saturated water solution of chlorine containing an excess of free chlorine, a solution containing an alkali metal salt of aci-1-nitrobutane, and from one to approximately two moles of an alkali metal hydroxide, concomitantly introducing additional chlorine into said solution at such a rate as compared to the rate of introduction of the 1-nitrobutane solution, that the chlorine present in said solution is always in excess over the amount required to convert said basic substance to hypochlorite.

8. A process for preparing 1,1-dichloro-1-nitroalkanes having more than one carbon atom which comprises introducing into a saturated water solution of chlorine containing an excess of free clhorine, a solution containing a metal salt of an aci-nitroalkane having more than one carbon atom, from one to approximately two moles of sodium hydroxide, concomitantly introducing additional chlorine into said solution at such a rate as compared to the rate of introduction of the nitroalkane solution, that the chlorine present in said solution is always in excess as evidenced by the escape of chlorine from the reaction chamber.

9. A process for the continuous preparation of 1,1-dichloro-1-nitroalkanes having more than one carbon atom which comprises continuously adding a mixture of an alkaline salt of an aci-nitroalkane having more than one carbon atom and between one and two moles of an aqueous solution of a base to a saturated chlorine water solution containing an excess of free chlorine, continuously introducing thereinto additional chlorine at such a rate as compared to the introduction of the nitroalkane salt-base mixture as to insure a silght excess of free chlorine in the mixture at all times, continuously withdrawing reacted product and recovering therefrom the 1,1-dichloro-1-nitroalkane.

10. A process for the continuous preparation of 1,1-dichloro-1-nitroalkanes having more than one carbon atom which comprises continuously adding a mixture of an alkaline salt of an aci-nitroalkane having more than one carbon atom and between one and two moles of an aqueous solution of a base to a saturated chlorine water solution containing an excess of free chlorine, continuously introducing thereinto additional chlorine at such a rate as compared to the introduction of the nitroalkane salt-base mixture as to insure the escape of small quantities of chlorine from the mixture thereby indicating an excess of chlorine, continuously withdrawing reacted product and recovering therefrom the 1,1-dichloro-1-nitroalkane.

JOHN B. TINDALL.